US006533859B2

(12) United States Patent
Lamba et al.

(10) Patent No.: US 6,533,859 B2
(45) Date of Patent: Mar. 18, 2003

(54) SURFACE TREATED CARBON BLACK HAVING IMPROVED DISPERSABILITY IN RUBBER AND COMPOSITIONS OF RUBBER THEREFROM HAVING IMPROVED PROCESSABILITY, RHEOLOGICAL AND DYNAMIC MECHANICAL PROPERTIES

(75) Inventors: Rakshit Lamba, Acworth, GA (US); Frederick Ignatz-Hoover, Elyria, OH (US)

(73) Assignees: Flexsys America L.P., Akron, OH (US); Columbian Chemicals Company, Marietta, GA (US)

( * ) Notice: Subject to any disclaimer, the term of this patent is extended or adjusted under 35 U.S.C. 154(b) by 0 days.

(21) Appl. No.: 09/861,929

(22) Filed: May 21, 2001

(65) Prior Publication Data

US 2002/0014185 A1 Feb. 7, 2002

Related U.S. Application Data

(60) Provisional application No. 60/207,254, filed on May 26, 2000.

(51) Int. Cl.$^7$ ............................. C09C 1/44; C01D 3/00; C08K 5/17
(52) U.S. Cl. .................... 106/472; 106/476; 423/449.1; 423/449.2; 423/449.6; 524/80; 524/239
(58) Field of Search ................................ 106/472, 476; 423/449.1, 449.2, 449.6; 524/80, 237

(56) References Cited

U.S. PATENT DOCUMENTS

| | | | | |
|---|---|---|---|---|
| 3,882,186 A | | 5/1975 | Cain et al. ................... 260/780 |
| 4,158,000 A | * | 6/1979 | Nagasaki et al. ... 260/45.8 NW |
| 4,513,110 A | * | 4/1985 | Rader ........................ 524/432 |
| 4,557,306 A | | 12/1985 | Graves ....................... 152/548 |
| 4,764,547 A | | 8/1988 | Hatanaka et al. ........... 523/215 |
| 4,769,416 A | * | 9/1988 | Gelling et al. ................ 525/90 |
| 5,023,287 A | * | 6/1991 | Evans et al. ................. 524/255 |
| 5,118,807 A | * | 6/1992 | Wheeler ...................... 544/197 |
| 5,128,392 A | * | 7/1992 | DeTrano et al. ............ 523/166 |
| 5,208,280 A | * | 5/1993 | Wheeler ...................... 524/100 |
| 5,461,098 A | | 10/1995 | Hitchcock et al. .......... 524/297 |
| 5,575,845 A | * | 11/1996 | Belmont et al. ............ 106/712 |
| 5,630,868 A | * | 5/1997 | Belmont et al. ......... 106/31.75 |
| 5,672,198 A | * | 9/1997 | Belmont .................... 106/20 R |
| 5,707,432 A | * | 1/1998 | Adams et al. .............. 106/31.6 |
| 5,708,055 A | | 1/1998 | Joyce et al. ................. 523/215 |
| 5,851,280 A | * | 12/1998 | Belmont et al. ............ 106/472 |
| 5,872,177 A | | 2/1999 | Whitehouse ................ 524/495 |
| 5,877,238 A | | 3/1999 | Mahmud et al. ............ 523/215 |
| 5,959,126 A | | 9/1999 | Lohr, Jr. et al. ............ 552/301 |
| 6,110,994 A | * | 8/2000 | Cooke et al. ................ 523/215 |
| 6,184,276 B1 | * | 2/2001 | Ignatz-Hoover ............ 524/237 |
| 6,248,808 B1 | * | 6/2001 | Sone et al. ................. 523/215 |
| 6,287,374 B1 | * | 9/2001 | Yanagida et al. .......... 106/31.9 |

FOREIGN PATENT DOCUMENTS

| | | | |
|---|---|---|---|
| GB | 1421011 | 1/1976 | ............... C08J/3/22 |
| WO | WO 91/15425 | 10/1991 | ........... C01B/31/00 |
| WO | WO 99/20687 | 4/1999 | ............. C08K/5/34 |

OTHER PUBLICATIONS

Derwent Abstract of Japanese Patent No.: JP 08183883 Jul. 1996.
Derwent Abstract of Japanese Patent No.: JP 10388771 Dec. 1998.
Derwent Abstract of Japanese Patent No.: JP 6107863 Apr. 1994.
Derwent Abstract of Japanese Patent No.: JP 49038694 Oct. 1974.
International Search Report of International Patent Application No. PCT/US01/16455.
Fitch, W.L., et al, "Characterization of Carbon Black Adsorbates and Artifacts Formed During Extraction", Analytical Chemistry, vol. 50, No. 14, Dec. 14, 1978, pp. 2122–2126.
Derwent Abstract No.: 87–345624/49 of Japanese Patent No.: J6 2250–073–A Oct. 1987.
Derwent Abstract No.: 89–063870/09 of Japanese Patent No.: J0 1014–256–A Jan. 1989.
Derwent Abstract No.: 89–063871/09 of Japanese Patent No.: J0 1014–257–A Jan. 1989.
Derwent Abstract No.: 89–367691/50 of Japanese Patent No.: J0 1275–666–A Nov. 1989.
Chemical Abstract No.: 40098S–AEGH of Japenese Patent No.: JA–7120886R Jun. 1971.
Derwent Abstract No.: 99–283622/24 of Japanese Patent No.: JP 11092570–A Apr. 1999.
Derwent Abstract No.: 99–029171–03 of Japanese Patent No.: 10292127–A Nov. 1998.
Derwent Abstract No.: 98–154141/14 of Japanese Patent No.: JP 10025429–A Jan. 1998.
Derwent Abstract No.: 98–141105/13 of Japanese Patent No.: JP 10017712–A Jan. 1998.

(List continued on next page.)

*Primary Examiner*—Mark L. Bell
*Assistant Examiner*—Patricia L. Hailey
(74) *Attorney, Agent, or Firm*—Louis A. Morris

(57) ABSTRACT

The invention comprises a composition comprising a combination of carbon black and at least one surface treating agent selected from the group consisting of quinone compounds, quinoneimine compounds and quinonediimine compounds, as well as methods of obtaining the composition and the use of the composition in dispersing carbon black in a natural or synthetic polymer. The composition achieves increased dispersibility and improved mixing characteristics of the carbon black and improved processability of the carbon black containing polymer.

20 Claims, No Drawings

OTHER PUBLICATIONS

Derwent Abstract No.: 92–076397–/10 of Japanese Patent No.: JO 4020–579–A Jan. 1992.
Derwent Abstract No.: 92–033970/05 of European Patent No.: EP 468–140–A Jan. 1992.
Derwent Abstract No.: 92–020273/03 of Japanese Patent No.: JO 3269–031–A Nov. 1991.
Derwent Abstract No.: 90–080921/11 of Japanese Patent No.: JO 2035–929–A Jun. 1990.
Derwent Abstract No.: 89–259846/36 of Japanese Patent No.: JO 1188–562–A Feb. 1989.
Derwent Abstract No.: 89–011206/02 of Japanese Patent No.: J6 3286–470–A Nov. 1988.
Chemical Abstract No.: 18655S–AEG of US Patent No.: US–3,565,658–A Feb. 1971.
Chemical Abstract No.: 62,245P of Netherlands Patent No.: 65,16084 Dec. 1964.
CAPLUS Abstract of Japanese Patent No.: JP 58024462 May 1983.
CAPLUS Abstract of Japanese Patent No.: JP 45005643 Feb. 1970.
T. Yamaguchi et al., *Kautechuk Gummi Kunststoffe*, vol. 42, No. 5, 1989, pp. 403–409 Month Not Available.
L. Gonzalez et al., *Rubber Chemistry and Technology*, vol. 69, 1996, pp. 266–272 Month Not Available.

* cited by examiner

SURFACE TREATED CARBON BLACK HAVING IMPROVED DISPERSABILITY IN RUBBER AND COMPOSITIONS OF RUBBER THEREFROM HAVING IMPROVED PROCESSABILITY, RHEOLOGICAL AND DYNAMIC MECHANICAL PROPERTIES

CROSS REFERENCE TO RELATED APPLICATION

This application claims priority from Provisional Application No. 60/207,254, filed May 26, 2000.

BACKGROUND OF THE INVENTION

1. Field of the Invention

This invention relates to the preparation of a surface treated carbon black and the compounds derived therefrom. The invention relates to the preparation of a surface treated carbon black which has inherently improved dispersability characteristics and provides rubber compounds with improved dynamic mechanical properties.

2. Discussion of the Prior Art

Improvements in manufacturing of carbon black have allowed for the production of very high surface area carbon black suitable to provide high reinforcement and high levels of wear resistance. With the reduction in the particle size and carbon black structure (the degree of branched connectivity of the carbon black), carbon black becomes increasingly difficult to disperse.

Another phenomenon, carbon black networking, also known as the Payne effect, becomes increasingly prevalent as carbon black content in a rubber compound increases, especially as the particle size decreases and structure increases. This carbon black networking effect is manifested by a dramatic drop in modulus as a function of strain in the rubber compound. This drop in modulus is attributed to a disruption in the carbon black network and is a non-elastic phenomenon. That is to say that the energy required to disrupt this carbon black network is consumed in the disruption of the carbon black aggregate-aggregate interaction and is not recoverable as elastic energy.

The loss in energy due to the Payne effect results in compounds with inherently high loss moduli and, consequently, quite hysteretic. This hysteresis contributes to rolling resistance in pneumatic tire tread compounds increasing fuel consumption.

Previous inventions (Japanese Patent No. 5643/1970, No. 24462/1983, and No. 30417/1968) disclose surface treated carbon black which provide lower cohesive energy density between the particles. However, these materials are not effective in high surface area carbon black. Other patents (U.S. Pat. No. 4,557,306) teach that carbon black modified with Furazan oxides and furazan ring containing compounds provide for improvements in rubber to filler interaction but do not contribute to improvements in the dispersability of the carbon black. And finally, U.S. Pat. No. 4,764,547, teaches that compounds with lower viscosity (thus improved processability) and improved reinforcement properties can be achieved through the use of high surface area carbon black treated with certain amine compounds or quinoline compounds.

Other carbon black coupling agents are known in the art. See, for example T. Yamaguchi et al. in *Kautschuk Gummi Kunststoffe*, Vol. 42, No. 5, 1989, pages 403–409, which describes a coagent called Sumifine® (i.e. N,N'-bis(2-methyl-2-nitropropyl)-1,6-diaminohexane), and L. González et al. in *Rubber Chemistry and Technology*, Vol. 69, 1996, pages 266–272. These agents are not used in common practice.

U.S. Pat. No. 4,764,547 teaches that carbon black treated with conventional antidegradants used in the tire industry can afford an improvement in mixing efficiency. These antidegradants are divided into substituted amines such as paraphenylene diamine and quinoline. Both classes of antidegradants are known as primary antidegradants and function by donating a hydrogen atom to a radical.

The use of an amine compound for carbon surface modification is also disclosed in Japanese abstract J6 2250-073-A.

Carbon black can be difficult to disperse in polymers when the surface area is high. The rate of dispersion of carbon black in polymers is proportional to the viscosity of the polymer, that is, a high viscosity polymer provides faster rates of carbon black dispersion. In the cases of isoprene based rubbers and natural rubber, long mixing time increases the amount of heat generated in the compound and thus reduces viscosity and thus the rate and extent of carbon black dispersion. One technique to overcome this difficulty is to mix carbon black into the polymer several times in internal mixers for short intervals each time. This provides for less time for heat to be generated in the mixer and thus the amount of viscosity reduction is minimized and dispersion is improved, but increasing the number of mixing steps also increases the complexity, time required and expense of the process.

SUMMARY OF THE INVENTION

In its primary embodiments, the present invention provides compositions comprising a combination of carbon black and at least one surface treating agent selected from the group consisting of quinone compounds, quinoneimine compounds and quinonediimine compounds.

In its second embodiments, the present invention comprises the methods of combining the surface treating agent with the carbon black.

Third embodiments of the present invention relate to compositions resulting from the addition of the above combination of carbon black and one or more surface treating agents to natural or synthetic polymers.

In its fourth embodiments, the present invention relates to methods of dispersing carbon black in a natural or synthetic polymer composition, to achieve increased dispersibility, improved mixing efficiency and improved processability of the composition, comprising treating the surface of carbon black with at least one surface treating agent selected from the group consisting of quinone compounds, quinoneimine compounds and quinonediimine compounds, or mixtures thereof, and mixing the treated carbon black with the polymer composition.

Other embodiments of the invention encompass details about relative amounts of reactants, surface treating agents, carbon black, rubber compositions and methods of combining carbon black and surface treating agents and dispersing the carbon black into the polymer composition all of which are hereinafter disclosed in the following discussion of each of the facets of the invention.

DETAILED DESCRIPTION OF THE INVENTION

The invention provides for the preparation of carbon blacks treated with at least one surface treating agent selected from a class of quinone, quinonediimine or quinoneimine compounds. This treated carbon black shows dramatic improvements in dispersability (as measured by both rate of dispersion and extent of dispersion), improved mixing efficiency and improved processability over carbon black not treated with the surface treating agent. The treated carbon black: enhances the formation of bound rubber in compositions such as natural or synthetic elastomers, plastics or blends thereof and, in particular, butadiene-based rubber, providing improved reinforcement characteristics. The vulcanizates prepared therefrom exhibit improved dynamic mechanical properties as compared to vulcanizates prepared with carbon black not treated with the surface treating agent.

Increasing the surface area of carbon blacks leads to improved treadwear, while decreasing the structure improves tear resistance and fatigue crack growth resistance. However, increasing surface area and/or decreasing structure in carbon blacks makes mixing to adequate levels of dispersion even more difficult. A number of additives such as processing oils, amine antidegradants and furazans can increase the rate of filler incorporation, enhance processability or improve polymer to filler interactions, but do not provide all three of those desireable properties.

High shear and/or long mixing cycles are required to obtain optimum dispersion of fillers such as carbon blacks in rubber compounds. For example, adequate dispersion of N121 carbon black in natural rubber (NR) typically cannot be achieved in a single pass. Therefore, to obtain acceptable carbon black dispersion, most rubber compounds are mixed using two or more mixing passes. This increases the cost of the compound as well as limiting mixing capacity.

This invention focuses on the use of a quinone, quinonediimine or quinoneimine antidegradant as a surface treatment for carbon black. These surface treated carbon blacks exhibit improved mixing characteristics and improved processability, including substantial improvements in dispersability. Improved processability results from the viscosity reduction in natural rubber resulting from use of the treated carbon black. Viscosity reduction is due to peptization, i.e., chain-scission, which results in a decrease in molecular weight. In addition to improved dispersion, this class of chemicals also imparts improvements in bound rubber in natural and synthetic elastomers.

We have found that surface treating carbon black with quinone, quinoneimine, or quinonediimine results in a product that disperses faster in a synthetic and natural rubber tread compound. It is intended that a very broad class of quinones, quinoneimines, or quinonediimines as dispersion agents are suitable for use in the invention, limited primarily by considerations of practicality of physical properties of the agents or the chemical activity of or stearic hindrance caused by various substituted groups on the molecules of the dispersion agents. Preferably, the surface treating agent is a quinoneimine or quinonediimine, more preferably a quinonediimine. With regard to all of the above surface treating agents, the para isomer is preferred.

Effective quinones for use in the invention include those represented by the following formulas Ia and Ib:

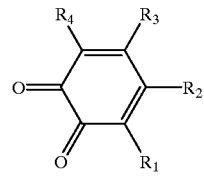

Formula Ia

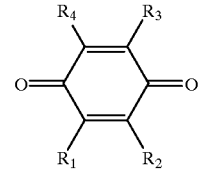

Formula Ib wherein $R_1$, $R_2$, $R_3$, and $R_4$ are the same or different and are selected from hydrogen, hydroxyl, alkyl, alkoxy, aryloxy, alkenyl, cycloalkyl, aryl, aralkyl, alkaryl, alkylamino, arylamino, heterocycle, acyl, aroyl, cyano, halogen, thiol, thioalkyl, thioaryl, amino, nitro, sulfonate, sulfone, sulfonamide, carboxylic acid, alkyl ester and, aryl ester, and the alkyl moieties in the $R_1$, $R_2$, $R_3$, and $R_4$ groups may be linear or branched and each of the $R_1$, $R_2$, $R_3$, and $R_4$ groups may be further substituted where appropriate.

Effective quinoneimines for use in the invention include those represented by the following formulas IIa and IIb:

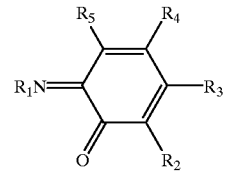

Formula IIa

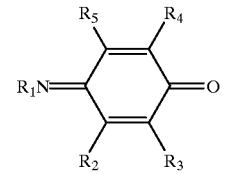

Formula IIb wherein $R_1$ is selected from hydrogen, hydroxyl, alkyl, alkoxy, aryloxy, alkenyl, cycloalkyl, aryl, aralkyl, alkaryl, alkylamino, arylamino, heterocycle, acyl, aroyl, cyano, halogen, thiol, thioalkyl, thioaryl, amino, nitro, sulfonate, sulfone, sulfonamide, carboxylic acid, alkyl ester and, aryl ester, wherein the alkyl moieties in the $R_1$ groups may be linear or branched and each of the $R_1$ groups may be further substituted where appropriate; further wherein $R_2$, $R_3$, $R_4$, and $R_5$ are the same or different and are selected from hydrogen, hydroxyl, alkyl, alkoxy, aryloxy, alkenyl, cycloalkyl, aryl, aralkyl, alkaryl, alkylamino, arylamino, heterocycle, acyl, aroyl, cyano, halogen, thiol, thioalkyl, thioaryl, amino, nitro, sulfonate, sulfone, sulfonamide, carboxylic acid, alkyl ester and, aryl ester, wherein the alkyl moieties in the $R_2$, $R_3$, $R_4$, and $R_5$ groups may be linear or branched and each of the $R_2$, $R_3$, $R_4$, and $R_5$ groups may be further substituted where appropriate.

Effective quinonediimines for use in the invention include those represented by the following formulas IIIa and IIIb:

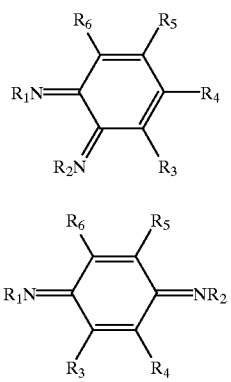

Formula IIIa

Formula IIIb wherein $R_1$ and $R_2$ are independently selected from hydrogen, hydroxyl, alkyl, alkoxy, aryloxy, alkenyl, cycloalkyl, aryl, aralkyl, alkaryl, alkylamino, arylamino, heterocycle, acyl, formyl, aroyl, cyano, halogen, thiol, alkylthio, arylthio, amino, nitro, sulfonate, alkyl sulfonyl, aryl sulfonyl, amino sulfonyl, hydroxy carbonyl, alkyloxycarbonyl and aryloxycarbonyl, wherein the alkyl moieties in the $R_1$ and $R_2$ groups may be linear or branched and each of the $R_1$ and $R_2$ groups may be further substituted; further wherein $R_3$, $R_4$, $R_5$, and $R_6$ are the same or different and are selected from hydrogen, hydroxyl, alkyl, alkoxy, aryloxy, alkenyl, cycloalkyl, aryl, aralkyl, alkaryl, alkylamino, arylamino, heterocycle, acyl, aroyl, cyano, halogen, thiol, alkylthio, arylthio, amino, nitro, sulfonate, alkyl sulfonyl, aryl sulfonyl, aminosulfonyl, hydroxycarbonyl, alkyloxycarbonyl and aryloxycarbonyl, wherein the alkyl moieties in the $R_3$, $R_4$, $R_5$, and $R_6$ groups may be linear or branched and each of the $R_3$, $R_4$, $R_5$, and $R_6$ groups may be further substituted where appropriate.

It is preferred that $R_1$ and $R_2$ are independently selected from alkyl, alkenyl, cycloalkyl, aryl, aralkyl and alkaryl for quinonediimines.

It is preferred that the number of carbon atoms in any and all of the above R groups be from 0 to about 25.

The most preferred surface treating agent is N-phenyl-N'-1, 3 dimethylbutyl-p-quinonediimine.

Carbon black suitable for use in the invention has a preferred surface area of from about 9 to about 420 m²/g, and most preferred from about 40 to about 140 m²/g, as measured by the nitrogen adsorption method (ASTM D 4820). The carbon black may be agglomerated in the form of beads or powder. The carbon black types have a preferred particle size of from about 8 to about 300 nm average particle size and most preferably from about 12 to about 100 nm.

The surface of the carbon black is preferably treated with from about 0.01 to about 150.0 parts by weight, most preferably from about 0.5 to about 8.0 parts by weight, of the surface treating agent per 100 parts by weight of carbon black.

The surface treating agents may be combined with carbon black beads or powder by spraying the beads or powder with the surface treating agents at a temperature of from above the melting point of the surface treating agent to a temperature below its decomposition temperature. The combination may also be effected by dissolving the surface treating agent in an appropriate solvent and applying the resulting solution to the beads or powder followed by removal of the solvent to produce the surface treated carbon black. Appropriate solvents include but are not limited to a hexane, THF, toluene, benzene and methanol.

For best results, the surface treating agents should be added to the carbon black at any point from the production site of the carbon black to prior to the mixing of the carbon black and surface treating agent combination with the polymeric material. Such treatment may occur at the entrance of the mixing device in which the carbon black and polymeric material are mixed.

Without intending to be limited to any particular theory, we believe that the surface treated carbon black of our invention works in a very special way in polymer compositions that accounts for their superior effectiveness. There is some evidence indicating the surface treating agents are bound into the polymer structure of the rubber rather than just acting as a wetting agent which is the case with the anti-degradents of U.S. Pat. No. 4,764,547.

To explain further, our carbon black surface treating agents contain a non-nucleophilic nitrogen and is an electron acceptor. As mentioned above, this is distinguished from the anti-degradents of U.S. Pat. No. 4,764,547 that contain nucleophilic nitrogen and are electron donors and/or hydrogen atom donors. Our surface treating agents react differently with radicals, i.e. by addition reactions with the radicals, the effect being an active rather than an inert surface treatment. This results not only in dispersion improvement, but also in the modification of the rheological and physical properties of a rubber compound.

The natural or synthetic polymers used in accordance with the invention may be natural rubber (NR), a synthetic rubber such as isoprene rubber (IR) or a mixture thereof. Such polymers may be natural or synthetic elastomers, plastics, or blends thereof. Preferably, the rubber composition comprises NR. Blends of a polyisoprene rubber with one or more other rubbers such as polybutadiene rubber or butadiene rubber (BR), styrene-butadiene rubber (SBR), and a mixture of BR and SBR may also be used.

In this application, the abbreviation "phr" means the number of parts by weight per 100 parts by weight of rubber. For example, in the case of a rubber blend, it would be based on 100 parts by weight of total rubber. "PhCB" means the number of parts by weight per 100 parts by weight of carbon black.

A sulfur-vulcanizable rubber composition typically contains carbon black in an amount from about 10 to about 100, preferably about 20 to about 80, more preferably about 40 to about 80 phr. It may also contain silica in an amount of 0 to about 80, preferably 0 to about 60, more preferably 0 to about 50 phr. It may also contain a silane coupling agent for silica. The typical amount of the silane coupling agent employed is between about 5 to about 20% by weight of the silica loading.

EXAMPLES

The following examples illustrate the practice and benefits of our invention.

Initially the surface treated carbon black product was evaluated using laboratory scale mixing equipment. This was followed by factory scale mixing experiments of NR and SBR tread formulations.

The following surface treated products were prepared by directly spraying quinondiimines (in this case N-phenyl-N'-1,3 dimethylbutyl-p-quinonediimine (Compound A)) onto the surface of carbon black.

For initial laboratory evaluations, a sample consisting of 4.4 PhCB of Compound A was used.

Example 1
Laboratory Evaluation of Surface Treated Carbon Black in NR.

The NR formulations used for initial evaluation are given in Table 1.

TABLE I

NR Tread Formulation for Lab. Evaluation of Surface Treated N-121 Carbon Black

| NR Control | | NR Surface Treated Carbon Black | |
|---|---|---|---|
| First Pass Mix | Phr | First Pass Mix | Phr |
| SMR CV60[1] | 100 | SMR CV 60 | 100 |
| N-121[2] | 50 | N-121 (4.4 PhCB Compound A) | 52.2 |
| Zinc Oxide | 4.0 | Zinc Oxide | 4.0 |
| Stearic Acid | 1.5 | Stearic Acid | 1.5 |
| Microcrystalline wax | 1.0 | Microcrystalline wax | 1.0 |
| 6PPD[3] | 2.2 | | |
| Total | 158.7 | Total | 158.7 |
| Final Mix | Phr | Final Mix | Phr |
| First Pass Mix | 158.7 | First Pass Mix | 158.7 |
| TBBS[4] | 1.6 | TBBS | 1.6 |
| Sulfur | 1.2 | Sulfur | 1.2 |
| Total | 161.5 | Total | 161.5 |

[1]Standard Malaysian rubber
[2]This and all following carbon black designations are in a accordance with the ASTM Classification system
[3]N-(1,3-dimethylbutyl)N'-phenyl-p-phenylenedediamine
[4]N-tert-butyl-2 benzothiazolesulfenamide

[1]Standard Malaysian rubber
[2]This and all following carbon black designations are in accordance with the ASTM Classification system
[3]N-(1, 3-dimethylbutyl) N'-phenyl-p-phenylenediamine
[4]N-tert-butyl-2 benzothiazolesulfenamide The degree of carbon black dispersion found for the first pass mixes are compared in Table 2 below.

Dispersion analysis is carried out in accordance with ASTM D 2663-93 Test Method C, Annual Book of ASTM Standards, Vol., 09.01, Sect. 9, p. 468,1993, and is reported as dispersion index (DI).

TABLE 2

Dispersion Index and Mooney Viscosity for NR Tread Compound

| Property | N-121/ COMPOUND A Surface Treated Product Treated | N-121 + COMPOUND A Added in-situ Control | N-121 + 6-PPD Added in-situ Control |
|---|---|---|---|
| Master batch Properties | | | |
| DI (Master batch) | 91 | 77 | 77 |
| Frequency (p/cm) | 27 | 51 | 51 |
| Height (micrometers) | 2.4 | 2.3 | 2.3 |
| $F^2H$ | 1735 | 5872 | 5814 |
| Compound Properties | | | |
| Mooney Viscosity $M_L$ (1 + 4) | 86 | 87 | 92 |
| 100% Modulus (MPa) | 3.3 | 3.7 | 3.6 |

The data in Table 2 shows that Compound A surface treated carbon black yields an improved dispersion index of 91, the control masterbatch that was mixed with 6-PPD (an amine as taught in the prior art) had a dispersion index of 77. The average height (H) of the peaks (undispersed carbon black) for all the samples was similar (about 2.3 micrometers). However, the frequency of peaks/cm (P/cm) was significantly lower for the Compound A surface treated carbon black (27 vs. 51). Hence $F^2H$, which is used to calculate the dispersion index was also lower. The additional benefits observed were reductions in viscosity and modulus. A reduction in viscosity would make natural rubber easier to process, while a reduction in modulus would permit higher filler loading and hence potential material cost savings. With further regard to Table 2, "Added in-situ" means that the surface treating agent was added to the masterbatch rather than used to treat the carbon black.

Example 2
Large Scale Evaluation of Surface Treated Black in NR.

This carbon black treated with Compound A was then mixed in an 80 L internal mixer (Farrell model FT-80C) and compared to a compound prepared with the N-121 not treated with Compound A. The formulations used are given in Table 3 below.

TABLE 3

NR Tread Formulations for Large Scale Evaluation of Surface Treated N-121 Carbon Black

| NR Control | | NR Surface Treated Black | |
|---|---|---|---|
| Master Batch | Phr | Masterbatch | Phr |
| SIR 10[5] | 100 | SIR 10 | 100 |
| N-121 | 50 | N-121 (4.4 PhCB Compound A) | 54 |
| Zinc Oxide | 4 | Zinc Oxide | 4 |
| Stearic Acid | 1.5 | Stearic Acid | 1.5 |
| Microcrystalline wax | 1 | Microcrystalline wax | 1 |
| Total | 156.5 | Total | 160.5 |
| Final Mix | Phr | Final Mix | Phr |
| Masterbatch | 156.5 | Masterbatch | 160.5 |
| TMQ[6] | 0.7 | TMQ | 0.7 |
| TBBS | 1 | TBBS | 1 |
| Sulfur | 2 | Sulfur | 2 |
| 6PPD | 2 | | |
| Total | 162.2 | Total | 164.2 |

[5]Standard Indonesian Rubber
[6]2,2,4-Trimethyl-1,2-dihydroquinoline, an antioxidant

[5]Standard Indonesian Rubber
[6]2,2,4-Trimethyl-1,2-dihydroquinoline, an antioxidant Ingredients for the 'first mix' were mixed with the rotor and wall temperature at 120° F., ram pressure at 60 PSI, and fill factor (volume % of the mixer that is filled) of 73%. The batches were mixed to a temperature of 350° F. as measured by a thermocouple located in the mixer. The batches were sheeted on a two-roll mill and allowed to cool. The average of three mixes each are reported below for the control black and the black treated with Compound A.

As seen in Table 4 below, mixing times in the second stage are reduced ~40–45% when the carbon black is treated with Compound A. Overall, total mixing times are reduced by 18 to 27% (first pass mix time plus second pass mix times).

TABLE 4

Large Scale Mixing Characteristics of Surface Treated Carbon Black Product (AB)

| Compound | Master Batch (first mix) | | | Final Mix (second mix) | | | Dispersion Index |
|---|---|---|---|---|---|---|---|
| | Rotor Speed Rpm | Dump Temp ° F. | Dump Time Seconds | Rotor Speed Rpm | Dump Temp ° F. | Dump Time Seconds | |
| Control | 70 | 358 | 127 | 26 | 225 | 187 | 70 |
| AB | 70 | 360 | 124 | 26 | 226 | 106 | 80 |
| AB | 52 | 357 | 152 | 26 | 217 | 106 | 83 |

The 'first mixes' were allowed to relax for at least 4 hours but not more than 48 hours then mixed again. The rotor and wall temperatures were set to 120° F., ram pressure @40 PSI, and the fill factor was 69%. The mixes were mixed to a temperature of 210° F. as measured by a thermocouple located in the mixing chamber.

The above batches were cured in a rubber process analyzer (RPA model 2000) at 150° C. for 15 minutes. Dynamic mechanical properties were measured by a strain sweep having a frequency of 100 cycles per second. As expected, slight reductions in G' (elastic component of shear modulus) occurred while greater reductions in G" (viscous component of shear modulus) were observed. Averaging two mixes prepared as described above gave the reductions in loss tangent as a function of strain as shown in the following Table 5:

The above batches were cured in a rubber process analyzer (RPA model 2000) at 150° C. for 15 minutes. Dynamic mechanical properties were measured by a strain sweep having a frequency of 100 cycles per second. As expected, slight reductions in G' (elastic component of shear modulus) occurred while greater reductions in G" (viscous component of shear modulus) were observed. Averaging two mixes prepared as described above gave the reductions in Loss Tangent (Tan D) as a function of strain as shown in the following Table 5:

Example 3

Laboratory Scale Evaluation of an NR/BR (BR is butadiene rubber) Sidewall Compound.

A sidewall recipe containing NR/BR in a 55/45 parts ratio and 50 phr of N550 carbon black was mixed on a laboratory scale and evaluated for physical properties and carbon black dispersion. The recipe is shown in table 6 below. The physical properties and dispersion information are shown in table 7. The batch mixed using the Compound A treated N550 exhibited an improvement in carbon black dispersion but not the reduction in viscosity or 100% modulus that was seen with the NR tread recipe.

TABLE 6

NR/BR Sidewall Recipe for Laboratory Evaluation Compound A Treated N550 Carbon Black

| NR/BR Control | | NR/BR Surface Treated Black | |
|---|---|---|---|
| Master Batch | Phr | Master Batch | phr |
| SMR CV-60 | 55.0 | SMR CV-60 | 55.0 |
| Butadiene Rubber | 45.0 | Butadiene Rubber | 45.0 |
| N-550 | 50.0 | N-550 (4.6 PhCB 6Compound A) | 52.3 |

TABLE 5

RPA Dynamic Mechanical Properties Measured at 60° C.

| | Control 70 RPM Average of two mixes | | | Surface Treated Carbon Black –70 RPM Average of two mixes | | | Percent Change in Properties Compared to Control | | |
|---|---|---|---|---|---|---|---|---|---|
| % Strain | G' kPa | G" kPa | Tan D | G' kPa | G" kPa | Tan D | G' | G" | Tan D |
| 0.56 | 3223 | 244 | 0.0755 | 2745 | 182 | 0.0660 | −14.8 | −25.5 | −12.6 |
| 0.98 | 2880 | 240 | 0.0833 | 2522 | 180 | 0.0715 | −12.4 | −25.0 | −14.2 |
| 1.95 | 2499 | 266 | 0.1065 | 2235 | 202 | 0.0903 | −10.6 | −24.1 | −15.2 |
| 5.02 | 2050 | 260 | 0.1269 | 1873 | 207 | 0.1105 | −8.6 | −20.4 | −13.0 |
| 10.04 | 1799 | 252 | 0.1398 | 1669 | 204 | 0.1220 | −7.2 | −19.0 | −12.7 |
| 24.97 | 1393 | 349 | 0.2504 | 1331 | 314 | 0.2362 | −4.5 | −9.8 | −5.7 |
| 49.94 | 1122 | 337 | 0.3005 | 1080 | 318 | 0.2940 | −3.7 | −5.7 | −2.2 |

Loss tangent is proportional to energy loss or hysteresis, is measured as the ratio of G" (loss modulus, kilo Pascals) to G' (storage modulus, kilo Pascals) and is termed loss tangent or Tan D. Tan D is proportional to rolling resistance and thus fuel efficiency of a tire compound. Compounds with a lower Tan D measured at 60° C. will have lower rolling resistance and thus be more fuel efficient.

TABLE 6-continued

NR/BR Sidewall Recipe for Laboratory Evaluation
Compound A Treated N550 Carbon Black

| NR/BR Control | | NR/BR Surface Treated Black | |
|---|---|---|---|
| Zinc oxide | 3.0 | Zinc oxide | 3.0 |
| Stearic acid | 1.5 | Stearic acid | 1.5 |
| 6-PPD | 2.3 | 6-PPD | 0.0 |
| Napthenic oil | 10.0 | Napthenic oil | 10.0 |
| Microcrystalline wax | 2.0 | Microcrystalline wax | 2.0 |
| Total | 168.8 | Total | 168.8 |
| Final Mix | Phr | Final Mix | phr |
| Master Batch | 168.8 | Master Batch | 168.8 |
| TBBS | 1.0 | TBBS | 1.0 |
| Sulfur | 1.6 | Sulfur | 1.6 |
| Total | 171.4 | Total | 171.4 |

TABLE 7

Dispersion Index and Mooney Viscosity for NR/BR Sidewall Compound

| Property | N550/COMPOUND A Additive Product Treated | N550 + 6-PPD Added in-situ Control |
|---|---|---|
| Masterbatch Properties | | |
| DI (Masterbatch) | 98.4 | 96.5 |
| Frequency (p/cm) | 27 | 47 |
| Height (micrometers) | 2.2 | 1.7 |
| $F_2H$ | 1604 | 3755 |
| Compound Properties | | |
| Mooney Viscosity $M_L(1 + 4)$ | 45 | 46 |
| 100% Modulus (MPa) | 2.2 | 1.9 |

Example 4
Large Scale Evaluation of an SBR (styrene butadiene rubber) Tread Recipe The SBR recipe mixed and tested is detailed in Table 8 below. The batches were mixed to a first pass drop temperature of 350° F. using a fill factor of 69%. Rotor speeds were adjusted in order to produce a range of mix quality; i.e., to produce under mixed and over-mixed batches for comparison to properly mixed batches. The second pass mixes were dropped at 210° F. Mix cycle time, dispersion index, and Mooney viscosities were compared for each of the second pass mixes shown in Table 9 below. The second pass mix times were found to average ~40–50% shorter mixing times for the batches containing the Compound A treated carbon black. This leads to approximately a 20% decrease in the overall mix cycle times (first pass plus second pass times). No difference was found in the dispersion index between the control compounds and the compounds containing the treated carbon black. However, very large differences were found for the Mooney viscosities of the compounds containing the treated carbon black and the control compounds. Unlike the case of the NR tread compound, the Mooney viscosities of the SBR compounds containing surface treated carbon black were significantly increased over those of the corresponding control batches. This indicates either that the Compound A treatment has promoted greater interaction between the polymer and the carbon black or that it has prevented significant breakdown of the polymer during the mixing process. In either case treadwear should be improved versus the control compound.

TABLE 8

SBR Tread Compounds for Large Scale Evaluation of N-121 Surface Treated Carbon Black

| SBR Control | | SBR Surface Treated Carbon Black | |
|---|---|---|---|
| First Pass Mix | Phr | First Pass Mix | Phr |
| SBR | 100 | SBR | 100 |
| N-121 | 50 | N-121 (4.4 Compound A) | 52.2 |
| Zinc Oxide | 3.0 | Zinc Oxide | 3.0 |
| Stearic Acid | 2 | Stearic Acid | 2 |
| Aromatic oil | 10 | Aromatic oil | 10 |
| Microcrystalline wax | 1.0 | Microcrystalline wax | 1.0 |
| | 166.0 | | 168.2 |
| Final Mix | Phr | Final Mix | Phr |
| First Pass Mix | 166.0 | First Pass Mix | 168.2 |
| TBSI[7] | 1.7 | TBSI | 1.7 |
| TMTD[8] | 1.42 | TMTD | 1.42 |
| Sulfur | 2.07 | Sulfur | 2.07 |
| 6PPD | 2.2 | 6PPD | 0.0 |
| | 173.39 | | 173.39 |

[7]N-tert-Butyl-di(2-benzothiazolesulfen)imide
[8]Tetramethylthiuram disulfide

TABLE 9

Mix Cycle and Dispersion Data for SBR Tread Compound

| | Master Batch | | | Second Pass | | | | | | | |
|---|---|---|---|---|---|---|---|---|---|---|---|
| Compound | Rotor Speed Rpm | Dump Temp ° F. | Dump Time Seconds | Rotor Speed Rpm | Dump Temp ° F. | Dump Time Seconds | Dispersion Index | Bound Rubber Volume Fraction | Initial Mooney Vis. @ 121° C. | ML 1 + 4 @ 121° C. | Min. Mooney @ 121° C. (Mooney scorch test) |
| Control | 70 | 366 | 118 | 26 | 223 | 79 | 88.0 | 0.2480 | 121 | 88 | 88 |
| | 52 | 362 | 170 | 26 | 223 | 89 | 93.0 | 0.2541 | 121 | 88 | 88 |
| | 105 | 366 | 79 | 26 | 220 | 80 | 80.0 | 0.2540 | 120 | 89 | 88 |
| Surface Treated | 70 | 368 | 98 | 26 | 201 | 48 | 85.0 | 0.4016 | 156 | 114 | 111 |
| | 52 | 366 | 165 | 26 | 205 | 51 | 92.0 | 0.3775 | 153 | 106 | 103 |

TABLE 9-continued

Mix Cycle and Dispersion Data for SBR Tread Compound

| | Master Batch | | | Second Pass | | | | | | | |
|---|---|---|---|---|---|---|---|---|---|---|---|
| Compound | Rotor Speed Rpm | Dump Temp °F. | Dump Time Seconds | Rotor Speed Rpm | Dump Temp °F. | Dump Time Seconds | Dispersion Index | Bound Rubber Volume Fraction | Initial Mooney Vis. @ 121° C. | ML 1 + 4 @ 121° C. | Min. Mooney @ 121° C. (Mooney scorch test) |
| Carbon Black | 105 | 368 | 76 | 26 | 201 | 40 | 80.0 | 0.4018 | 170 | 127 | 121 |

What is claimed is:

1. A composition comprising a combination of carbon black and at least one surface treating agent selected from the group consisting of quinone compounds, quinoneimine compounds and quinonediimine compounds, wherein said combination is obtained by treating the surface of carbon black with said surface treating agent, said carbon black having a surface area from about 9 to about 420 m²/g as measured by the nitrogen adsorption method.

2. The composition of claim 1 wherein said carbon black has a surface area from about 40 to about 140 m²/g as measured by the nitrogen adsorption method.

3. The composition of claim 1 wherein carbon black particles have an average particle size of from about 8 to about 300 nm.

4. The composition of claim 1 wherein carbon black particles have an average particle size of from about 12 to about 100 nm.

5. The composition of claim 1 wherein the surface of said carbon black is treated with from about 0.01 to about 150.0 parts by weight of said surface treating agent per 100 parts by weight of carbon black.

6. The composition of claim 1 wherein the surface of said carbon black is treated with from about 0.5 to about 8.0 parts by weight of said surface treating agent per 100 parts by weight of carbon black.

7. The composition of claim 1 wherein said carbon black is agglomerated in the form of beads or powder.

8. The composition of claim 1 comprising natural or synthetic polymers.

9. The composition of claim 8 wherein said polymers are natural or synthetic elastomers, plastics or blends thereof.

10. The composition of claim 1 wherein said quinone compounds are selected from the group consisting of compounds represented by the following formulas Ia and Ib:

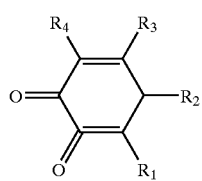

Formula Ia

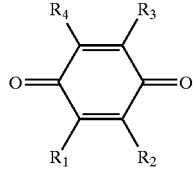

Formula Ib wherein $R_1$, $R_2$, $R_3$, and $R_4$ are the same or different and are selected from hydrogen, hydroxyl, alkyl, alkoxy, aryloxy, alkenyl, cycloalkyl, aryl, aralkyl, alkaryl, alkylamino, arylamino, heterocycle, acyl, aroyl, cyano, halogen, thiol, thioalkyl, thioaryl, amino, nitro, sulfonate, sulfone, sulfonamide, carboxylic acid, alkyl ester and, aryl ester, and the alkyl moieties in the $R_1$, $R_2$, $R_3$, and $R_4$ groups may be linear or branched and each of the $R_1$, $R_2$, $R_3$, and $R_4$ groups may be further substituted where appropriate.

11. The composition of claim 1 wherein said quinoneimine compounds are selected from the group represented by the following formulas IIa and IIb:

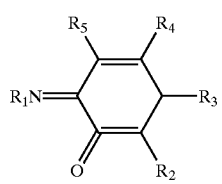

Formula IIa

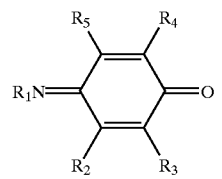

Formula IIb wherein $R_1$ is selected hydrogen, hydroxyl, alkyl, alkoxy, aryloxy, alkenyl, cycloalkyl, aryl, aralkyl, alkaryl, alkylamino, arylamino, heterocycle, acyl, aroyl, cyano, halogen, thiol, thioalkyl, thioaryl, amino, nitro, sulfonate, sulfone, sulfonamide, carboxylic acid, alkyl ester and, aryl ester, wherein the alkyl moieties in the $R_1$ groups may be linear or branched and each of the $R_1$ groups may be further substituted where appropriate; further wherein $R_2$, $R_3$, $R_4$, and $R_5$ are the same or different and are selected from hydrogen, hydroxyl, alkyl, alkoxy, aryloxy, alkenyl, cycloalkyl, aryl, aralkyl, alkaryl, alkylamino, arylamino, heterocycle, acyl, aroyl, cyano, halogen, thiol, thioalkyl, thioaryl, amino, nitro, sulfonate, sulfone, sulfonamide, carboxylic acid, alkyl ester and, aryl ester, wherein the alkyl moieties in the $R_2$, $R_3$, $R_4$, and $R_5$ groups may be linear or branched and each of the $R_2$, $R_3$, $R_4$, and $R_5$ groups may be further substituted where appropriate.

12. The composition of claim 1 wherein said quinonediimine compounds are selected from the group consisting of represented by the following formulas IIIa and IIIb:

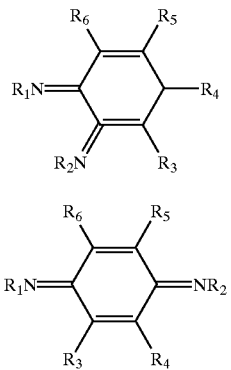

Formula IIIa

Formula IIIb wherein $R_1$ and $R_2$ are independently selected from hydrogen, hydroxyl, alkyl, alkoxy, aryloxy, alkenyl, cycloalkyl, aryl, aralkyl, alkaryl, alkylamino, aryl-amino, heterocycle, acyl, formyl, aroyl, cyano, halogen, thiol, alkylthio, arylthio, amino, nitro, sulfonate, alkyl sulfonyl, aryl sulfonyl, amino sulfonyl, hydroxy carbonyl, alkyloxycarbonyl and aryloxycarbonyl, wherein the alkyl moieties in the $R_1$ and $R_2$ groups may be linear or branched and each of the $R_1$ and $R_2$ groups may be further substituted; further wherein $R_3$, $R_4$, $R_5$, and $R_6$ are the same or different and are selected from hydrogen, hydroxyl, alkyl, alkoxy, aryloxy, alkenyl, cycloalkyl, aryl, aralkyl, alkaryl, alkylamino, arylamino, heterocycle, acyl, aroyl, cyano, halogen, thiol, alkylthio, arylthio, amino, nitro, sulfonate, alkyl sulfonyl, aryl sulfonyl, aminosulfonyl, hydroxycarbonyl, alkyloxycarbonyl and aryloxycarbonyl, wherein the alkyl moieties in the $R_3$, $R_4$, $R_5$, and $R_6$ groups may be linear or branched and each of the $R_3$, $R_4$, $R_5$, and $R_6$ groups may be further substituted where appropriate.

13. The composition of claim 12 wherein $R_1$ and $R_2$ are independently selected from alkyl, alkenyl, cycloalkyl, aryl, aralkyl and alkaryl.

14. The composition of claim 1 wherein said surface treating agent comprises N-phenyl-N'-1, 3 dimethylbutyl-p-quinonediimine.

15. A method for producing a surface treated carbon black to be mixed with a polymer composition, comprising combining carbon black beads or powder with a quinone, quinoneimine or quinonediimine surface treating agent at a temperature from above the melting point of said surface treating agent to a temperature below the decomposition temperature of said surface treating agent, prior to mixing said surface treated carbon black with said polymer composition.

16. A method for producing a surface treated carbon black, comprising dissolving a quinone, quinoneimine or quinonediimine surface treating agent in solvent and applying the resulting solution to carbon black beads or powder and removing the solvent to produce the surface treated carbon black.

17. The method of claim 16 wherein said solvent is selected from the group consisting of a hexane, THF, toluene, benzene and methanol.

18. A method of dispersing carbon black in a natural or synthetic polymer composition that achieves improved dispersibility and mixing requirements of said carbon black and improves the processability of the surface treated carbon black containing polymer composition, comprising treating the surface of carbon black with a surface treating agent comprising at least one compound selected from the group consisting of quinone compounds, quinoneimine compounds and quinonediimine compounds followed by mixing the surface treated carbon black with said polymer composition.

19. The method of claim 18 wherein said surface treating agent is combined with said carbon black at any point from the production site of said carbon black to prior to the mixing of the carbon black and surface treating agent combination with said polymer composition.

20. A composition to be mixed with a natural or synthetic polymer composition comprising a combination of carbon black and at least one surface treating agent selected from the group consisting of quinone compounds, quinoneimine compounds and quinonediimine compounds, said surface treating agent being combined with said carbon black by treating the surface of carbon black with said surface treating agent at any point from the production site of said carbon black to prior to the mixing of the carbon black and surface treating agent combination with said natural or synthetic polymer composition.

* * * * *